April 3, 1945.　　E. W. CLEM ET AL　　2,372,764
BEARING MOUNT FOR PAPER MAKING MACHINES
Filed Dec. 8, 1942
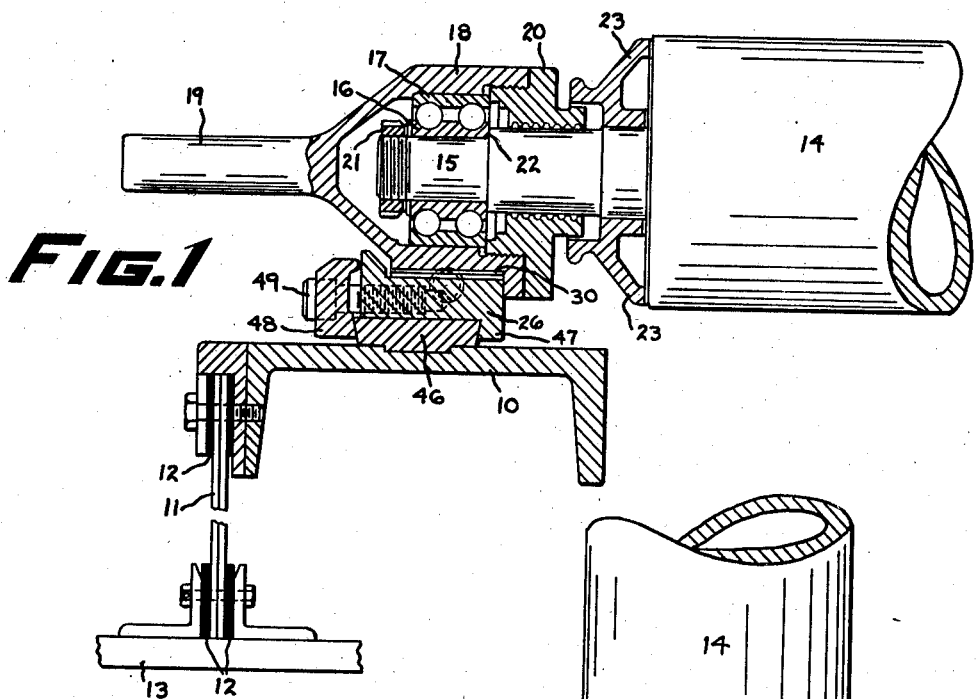
Fig.1
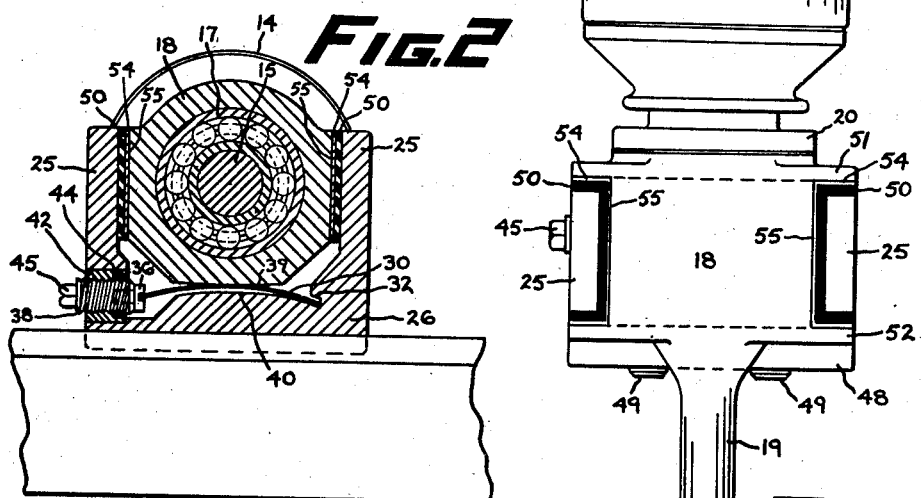
Fig.2
Fig.3
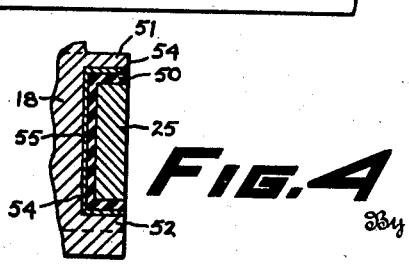
Fig.4
Inventors
EVERETT W. CLEM
JOHN P. MUNTON
By Clayton L. Jenks
Attorney Patented Apr. 3, 1945

2,372,764

UNITED STATES PATENT OFFICE 2,372,764

BEARING MOUNT FOR PAPERMAKING MACHINES

Everett W. Clem, Shrewsbury, and John P. Munton, Worcester, Mass., assignors to Rice Barton Corporation, Worcester, Mass., a corporation of Massachusetts Application December 8, 1942, Serial No. 468,228

7 Claims. (Cl. 92—44)

This invention relates to a paper making machine having an endless open mesh screen on which a paper web is laid, and more particularly to the mounts for a roll supporting the screen and especially the table rolls which are removably supported on bearings mounted on two side bars.

The conventional construction of table roll bearings and associated parts in a Fourdrinier machine has heretofore required that shims, eccentrics or direct screw devices be employed to raise and lower the table rolls to and from contact with the wire. Each has been found to have objectionable characteristics. For instance, the shims are difficult to install, and usually this cannot be done while the machine is in operation. An eccentric device cannot be used to raise one end of a roll vertically without throwing the roll out of axial parallelism with the adjacent rolls. The screw devices are hard to keep clean and this seriously affects their adjustment.

A standard construction permits shaking the wire screen transversely so as to affect the lay of the pulp fibres thereon. This is customarily accomplished by mounting one end of each side bar on vertical leaf springs which permit lateral movement. Since the shaking motion moves the table rolls in and out of parallelism with a given axial position, self-aligning anti-friction bearings for the ends of the table rolls have been used for the desired compensation. This type of bearing, however, has shallow raceways, and therefore has to be made larger than an anti-friction bearing having deeply grooved raceways to provide the same thrust capacity. The table rolls are often required to be supported quite close together, such as with one-half inch clearance therebetween. Hence the use of a larger bearing serves to move the table rolls farther apart, and for the same separation distance, larger rolls are required. The smaller number of rolls gives less contact with the wire screen and a lower water removing capacity for a given length of wire; hence it may be necessary to increase that length of wire and the number of rolls employed to get the required removal of water from the paper web. It is, therefore, highly desirable, not only to provide for self-alignment, but also to keep the bearing supports small so that the table rolls may themselves be small in diameter, consistent with the speed and the width of the machine, and thus provide the required contact with the wire.

The bearing housing supports should be simple in design and embody a minimum number of parts so as to avoid unnecessary wear and play. The rapid reciprocation of the wire supporting rolls tends to pound and wear away the bearing mounts and thus create knocking and finally bearing failures. A separate rubber buffer has been placed between each bearing housing and a supporting ring for the self-alignment of the rolls and to absorb the shocks incident to the shaking operation. Due to the lack of initial compression, this buffer has been subjected to frictional wear and pounding by the contacting metal housing. Also, it has been difficult to remove and assemble the bearings due to the difficulty of sliding metal on dry rubber. The use of exposed rubber rings requires frequent replacement of the worn parts and a careful adjustment of the rolls being reassembled with a consequent expense and waste of time. The shock absorbing and self-aligning resilient members should be so constructed that the rolls are capable of assemblage to a close tolerance and of being returned after removal quickly and readily to their initial working positions without requiring delicate adjustments thereof.

The primary object of this invention is to overcome the above mentioned problems and difficulties and to provide a paper making machine with a bearing mount for a screen supporting roll, such as the breast and table rolls, which permits ready adjustment, removability and accurate replacement of the roll.

It is a further object of this invention to provide a Fourdrinier paper making machine, having a shaking or vibrating screen supporting roll, with resilient supports for the roll which cushion the impacts against the roll bearing and given a long life of useful service, and particularly to provide a bearing and housing construction which permits self-alignment of a set of closely spaced, small diameter table rolls and yet carry a large load and absorb a high impact thrust.

An important object of the invention is to provide a Fourdrinier table roll section with a bearing mount for each table roll which permits ready removability and accurate adjustment of the table rolls and which has resilient shock absorbing members so constructed and arranged that they may be readily removed and replaced without affecting the alignment of the table rolls and their efficient operability. Further objects will be apparent in the following disclosure.

In accordance with our invention, a paper making machine having one or more rolls carrying an open mesh screen on which a paper web is laid is provided with a flexible bowed truss support for the bearing housing which is so constructed and arranged that the roll may be adjusted accurately to a desired position by varying the curvature of the truss. Also, a machine having a longitudinally shaking or vibrating roll or rolls may be provided with a resilient buffer between the housing and a guiding standard so as to absorb the shocks and to assure self-alignment of the roll when using a rigid or non-self-aligning ball or roller bearing. In order that the bearing housing may be removed and accurately replaced in its initial position, the buffer is secured to either the standard or the housing and it is provided with a metal facing which makes a metal to metal contact with a cooperating part on which it adjustably slides.

Referring to the drawing illustrating a preferred embodiment of our invention:

Fig. 1 is a fragmentary vertical section of a side bar carrying one end of a table roll mounted on our bearing construction;

Fig. 2 is a vertical transverse section through the bearing housing;

Fig. 3 is a top plan view of the bearing housing and the end of a table roll; and Fig. 4 is a sectional detail showing the metal to metal contact of the resilient buffer and the bearing housing supported thereby.

The paper making machine may be built in accordance with any desired construction, such as that shown in the U. S. patent to Vedder et al., No. 1,771,452, of July 29, 1930. Such a machine comprises a breast roll, a couch roll, a set of table rolls and a set of return rolls arranged to support an endless open mesh wire screen on which the paper pulp is laid. Each of these rolls may be removably mounted in axial parallelism on ball bearings carried on suitable supports, such as the machine base or side bars. The table roll section may be carried on two side bars 10, and these may, if desired, be supported on leaf springs clamped at each end between rubber blocks 12 and secured both to the side bar and to a base member 13 of the machine. Suitable mechanism is provided for moving the bars transversely and shaking the rolls. The breast roll and some return wire rolls may be suitably supported and arranged for longitudinal shaking, hence their bearing mounts may be constructed as herein described.

Each roll 14 may be of suitable dimensions and construction for supporting the wire. It may have a stepped, reduced portion at each end forming a journal 15 arranged for mounting in suitable bearings. The bearings may be of various constructions, but as illustrated comprise an inner raceway 16 and an outer raceway 17 having comparatively deep or suitable grooves arranged for carrying two rows of balls therebetween. The outer raceway is slidably fitted within a housing 18 provided with a hand hold extension 19 which projects beyond the side bars and serves for lifting the assembled parts out of position. A flanged ring 20 is threaded into the end of the housing 18 and serves to seal the grease within the bearings and to hold the outer raceway against an inner shoulder on the housing. A nut 21 on the end of the journal holds the inner raceway against a shoulder 22 on the journal. A cover 23 fits against the end of the roll to exclude water from the bearing and rotates therewith. These various parts may be made in accordance with any suitable construction. If desired, other standard or suitable types of bearings, such as roller bearings or split box bearings, may be employed, provided their housings or supports are so mounted that they may be adjusted vertically.

A primary feature of our invention resides in so mounting the bearing housings 18 at the opposite ends of the roll that a table roll 14 may be accurately adjusted vertically or lowered out of contact with the wire. To this end, each housing 18 is slidably mounted on a vertical standard, such as between the two arms 25 of a yoke or spaced standards integral with a base member 26. The inner slide surfaces of these yoke standards lie in parallel planes and the side faces of the housing 18 are likewise parallel for sliding therein. The vertical adjustment of the yoke is effected by means of a bendable trust member 30 shaped as a comparatively thin piece of spring material, such as bronze. As shown in Fig. 2, one end of this strip projects within a groove 32 in the yoke base 26 and the other end rests in a horizontal slot in a pin 36 which is pivotally mounted for rotating freely about a horizontal axis within a socket in an adjusting screw 38 mounted within one side wall of the yoke. The lower face 39 of the housing 18 may be flat or otherwise, and the top face 40 of the base member of the yoke is convex and so arranged that the truss 30 must bow upwardly when positioned as illustrated in Fig. 2. The adjusting screw 38 is threaded within a stationary nut 42 which has a parallel knurling on its outer periphery and is driven tightly into a suitably shaped hole in the side of the yoke so that the nut will not turn. A suitable form of locking nut is preferably employed so that the parts will not get out of adjustment. In the form shown, a fibre washer 44 is held within an annular groove in the nut 42 and secured in place by an overhanging flange. This washer has an inner cylindrical surface adapted to be cut by the threads of the adjusting screw 38, and it provides sufficient frictional force to keep the latter from turning accidentally. The screw, which is a precision adjustment device may be moved in and out by suitable means, such as a wrench applied to the projecting squared end 45 thereof. The parts may, of course, be reversed so that the truss 30 and the adjusting screw are mounted on the housing and the truss bows downwardly.

Adjustment of the pilot member 36 inwardly serves to bow the spring truss 30 to a greater or lesser curvature and thus to raise or lower the bearing housing 18. Each bearing at the end of the table roll may be precisely adjusted to bring the roll into alignment with a horizontal axial line, so that all of the rolls may be brought into axial parallelism. The convex surface 40 of the truss lies above the slot 32 and prevents the truss 30 from being lowered to a position in which it would be straight. The dimensions and arrangements of the parts may be as desired.

The yoke may be suitably secured to the associated side bar 10. For example, the latter may have an upwardly projecting slideway 46 secured thereto. This slideway is dove-tailed and the yoke engaging one side of the slideway 46. At the base 26 has a downwardly projecting flange 47 other side, a clamp member 48 is suitably secured in position by a screw 49, and this clamp member engages the yoke and slideway in such a manner as to clamp the yoke in any desired position of adjustment lengthwise of the slideway 48. By means of suitable graduation marks on the side bars 10, the two ends of each roll may be aligned at right angles to the center line of the machine. Then by adjusting the resilient supporting truss 30, each end of the roll 14 may be moved vertically to give the desired direct contact with the Fourdrinier wire. This mount may be employed for any of the wire supporting rolls of a paper making machine. This adjustment may be accomplished while the machine is in operation without interrupting the production.

A further feature of this invention comprises so mounting the bearing housing 18 that when a roll carrying the wire, such as the breast roll or the table rolls 14, is shaken or vibrated longitudinally, the shocks incident thereto will be absorbed and the roll will be self-aligning, or a set of table rolls will be held substantially in parallelism. To this end, we provide a rubber buffer between the housing 18 and a standard on which it is slidably mounted. In the construction illustrated, the standards 25 of the yoke guide the bearing housing therebetween. The rubber buffers 50 are located between two sets of parallel flanges 51 and 52 on opposite sides of the housing. These flanges form vertical, U-shaped grooves within which the yoke arms 25 are held, the parts being so arranged that the housing 18 may be dropped into position from above and adapted to slide vertically. Each rubber buffer 50 is U-shaped and located between the flanges and the sides of the housing and the three adjacent sides of the yoke arms 25. The buffers thus absorb the end thrusts in the transverse and longitudinal directions and permit transverse movement of the rolls into axial alignment as they are vibrated about the pivotal leaf springs 11.

It is desirable that there be a metal to metal contact between the relatively slidable parts of the bearing housing and the yoke standards. To this end, the rubber buffer is provided with a metal facing as by securing a metal slide member integrally thereto. This slide or facing makes a metal to metal sliding contact with a plane slide surface formed on the housing or on the associated standard, and the buffer is preferably secured to the other part. As shown, we have provided a channel shaped member 54 of brass or other suitable metal, which is secured to the rubber buffer 50 by suitable means, such as a mechanical clamping device or by cementing or vulcanizing the rubber strip in place within the channel. Similarly, the channel shaped rubber buffer 50 is secured to its associated yoke arm 25 by suitable means. Thus, the metal channel strip 54 is secured to the yoke arm but it may move slightly relative thereto because of the resilient rubber buffer 50 located therebetween. The metal slide facing may be arranged to slide on either the housing or the guiding standard. The flanges 51 and 52 and the inner vertical walls 55 of the housing 18 are shaped to form accurate slideways, and each brass member 54 contacts only with the three plane slide surfaces of the metal of the housing 18. Since the housing 18 has an accurate sliding fit with the member 54, there is no lateral play between the parts and the rubber buffer may be brought under a desired initial compression. When the two side bars 10 are shaken transversely and the rolls 14 are vibrated longitudinally, any tendency for the rolls to get out of axial parallelism is counteracted by a corresponding flow movement of the rubber buffer 50.

The resilient truss 30 not only serves for vertical adjustment of the roll but also cooperates with the rubber buffers to provide a resilient support for the roll which absorbs both lateral and vertical shocks incident to shaking the wire. The rubber buffers compensate for lateral movement of the roll journals and provide for self-alignment thereof, and any downward movement of the roll is resisted resiliently by the spring 30.

Each rubber buffer may be made of various types of material, but is preferably a rubber compound used in the trade for supporting motors. It may have various degrees of resiliency and hardness, but it is preferred to use a vulcanized rubber and sulfur compound which tests between 35 and 70 and preferably at about 50 on a Shore Durometer type A testing apparatus. Various synthetic rubbers or other resilient plastics may be substituted for the vulcanized rubber compound provided they will give the desired resiliency and freedom of movement to permit self-alignment of the table rolls and yet hold them substantially rigidly in position under the ordinary conditions of use.

It will be appreciated, in view of the above disclosure, that various modifications may be made in and equivalent constructions substituted for the bearing mount above described, hence the specification is to be interpreted as describing the principles underlying the invention and a preferred embodiment thereof and not as imposing limitations on the appended claims.

We claim:

1. In a paper making machine having a roll carrying an open mesh screen on which a paper web is laid, a bearing mount supporting the roll comprising a base, a bearing housing mounted on and movable relative to the base, a flexible truss carried by the base and having a bowed portion supporting the housing, and means for varying the curvature of the truss and adjustably positioning the housing and the roll carried thereby.

2. In a paper making machine having a roll carrying an open mesh screen on which a paper web is laid, a bearing mount supporting the roll comprising a base having a substantially vertical slide surface, a bearing housing mounted for sliding on said surface, a flexible truss carried by the base which has a bowed portion adjustably supporting the housing, and a precision adjustment device for varying the curvature of the truss and accurately positioning the housing and the table roll relative to the screen.

3. In a paper making machine having a roll carrying an open mesh screen on which a paper web is laid, a bearing mount supporting said roll comprising a base have spaced standards providing parallel vertical bearing surfaces, a bearing housing mounted between and in slidable engagement with the standards, a bearing carried by the housing and supporting an end of the roll, a flexible truss mounted on the base beneath the housing which has a bowed portion supporting the housing, and precision mechanism cooperating with the base which varies the curvature of the truss and adjusts the position of the housing vertically.

4. In a paper making machine having a pair of laterally shakable side bars carrying a set of table rolls which support an open mesh screen on which a paper web is laid, a bearing mount supporting an end of a roll comprising a pair of guiding standards, a bearing housing therebetween having spaced parallel flanges on its opposite sides which form channels within which the standards are located, said housing and each of the standards forming opposed slide members, a resilient buffer within each channel which is secured to one of the slide members, a channel shaped metal member secured to the buffer and slidably engaging the other slide member, said buffer being arranged for self-alignment of the bearings and to absorb both axial and transverse shocks incident to shaking the side bars, means for adjustably locating the housing on a side bar, and means for adjusting the housing vertically.

5. In a paper making machine having a roll carrying an open mesh screen on which a paper web is laid, a bearing mount supporting said roll comprising a laterally shakable standard, a bearing housing forming therewith two opposed slide members arranged for moving the housing vertically, a resilient buffer between the housing and the standard which is secured to one of said members and has a metal facing forming the slide surface thereof, a flexible bowed truss having its ends carried by one of said members and its bowed portion resiliently supporting the housing, and precision mechanism for varying the curvature of the truss and adjusting the housing vertically along the standard.

6. In a paper making machine having a roll carrying an open mesh screen on which the paper web is laid, a bearing mount supporting said roll comprising a laterally shakable yoke standard having two spaced vertical arms, a bearing housing between said arms, a resilient buffer secured to each arm, a metallic channel member secured to each buffer and forming a slide facing therefor, said housing having spaced flanges on its opposite sides forming channel guideways for the facings of said channel members which are so arranged that the housing may move for self-alignment of the shaking roll, a flexible bowed truss having its ends carried by the yoke standard and its bowed portion beneath and resiliently supporting the housing, and precision mechanism for varying the curvature of the truss and adjusting the housing vertically of the standard.

7. In a paper making machine having a support and a rotatable roll thereon carrying an open mesh screen on which a paper web is laid, a bearing mount supporting said roll comprising two members, one being a guiding standard on said support and the other a bearing housing slidably carried by the standard, a resilient buffer between the standard and the housing, said buffer having a metal slide secured thereto and being in turn secured to one of said members, the other member having a slide surface engaging said slide and providing therewith a metal to metal contact for adjustably guiding the housing, and means for moving the housing on the guiding standard and adjusting the position of the roll relative to said support.

EVERETT W. CLEM.
JOHN P. MUNTON.